United States Patent Office 2,843,421
Patented July 15, 1958

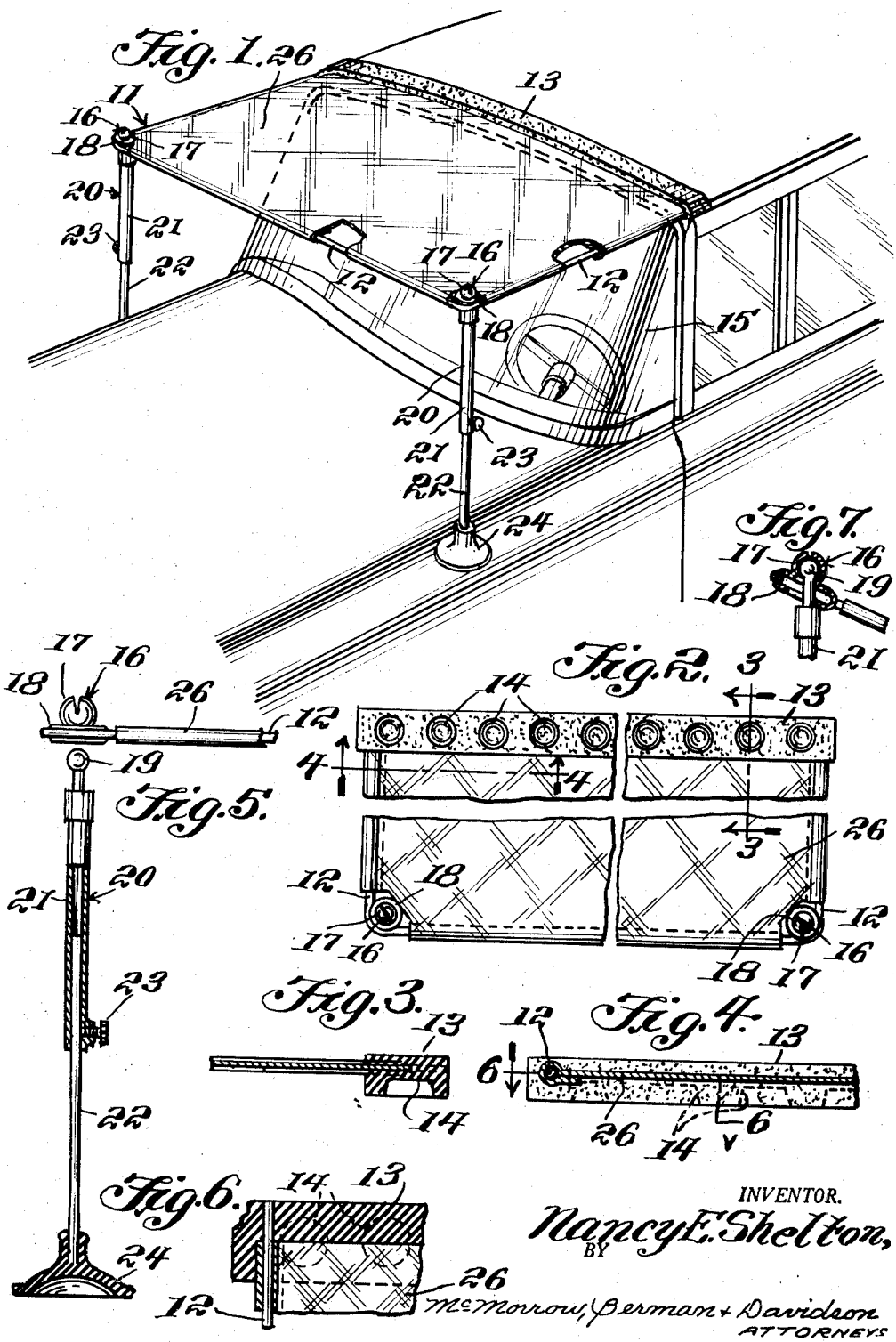

2,843,421
AUTOMOBILE WINDSHIELD AWNING

Nancy E. Shelton, North Little Rock, Ark.

Application February 23, 1955, Serial No. 490,002

1 Claim. (Cl. 296—95)

This invention relates to awnings, and more particularly to an improved windshield awning for an automobile.

A main object of the invention is to provide a novel and improved automobile windshield awning which is simple in construction, which is easy to mount on an automobile, and which is arranged to protect the windshield from becoming obscured by rain, sleet or the like.

A further object of the invention is to provide an improved automobile windshield awning which is inexpensive to fabricate, which is rugged in construction, which is readily collapsed to a compact volume for transportation or storage, and which is arranged to be installed quickly on an automobile when it is desired to protect the windshield thereof from becoming obscured by rain, snow, sleet or the like, for example, for use in drive-in theatres where the occupants of the vehicle require good visibility through the windshield of the automobile.

Further objects and advantages of the invention will become apparent from the following description and claim, and from the accompanying drawings, wherein Figure 1 is a fragmentary perspective view of the forward portion of an automobile, showing the manner in which an improved windshield awning device according to the present invention is installed over the windshield.

Figure 2 is a fragmentary bottom view of the main body portion of the windshield awning of Figure 1.

Figure 3 is an enlarged cross sectional detail view taken on the line 3—3 of Figure 2.

Figure 4 is an enlarged cross sectional detail view taken on the line 4—4 of Figure 2.

Figure 5 is a fragmentary enlarged side elevational view, partly in vertical cross section, showing one of the adjustable post elements employed with the windshield awning of Figures 1 to 4 and indicating the manner in which the post element is engaged with the corner portion of the main body of the awning device.

Figure 6 is an enlarged cross sectional detail view taken on the line 6—6 of Figure 4.

Figure 7 is an enlarged cross sectional detail view taken through the cooperating snap fastener elements on the top end of one of the post members and the corner portion of the main body of the windshield awning device of Figures 1 to 6.

Referring to the drawings, the windshield awning device is designated generally at 11 and comprises a generally U-shaped rigid frame 12 of suitable rigid rod material having the ends of its respective side arms secured in the respective end portions of a strip of rubber-like resilient deformable material 13, for example, having its ends embedded in the end portions of the strip 13 in the manner indicated in Figure 3.

The strip 13 is of sufficient length to extend substantially across the roof portion of a vehicle body and is integrally formed on its under side with the downwardly facing suction cups 14 adapted to grippingly engage the portion of the vehicle body adjacent the windshield 15 thereof in the manner illustrated in Figure 1.

Secured in the respective corner portions of the U-shaped frame 12 are respective downwardly facing female snap fastener socket elements 16, 16, said socket elements comprising the resilient metal sockets 17 which are fastened to supporting rings 18, said supporting rings being welded or otherwise suitably secured in the corner portions of the frame 12. The socket elements 16 are adapted to receive male fastener elements 19 secured to the top end portions of respective post members 20, said male socket elements 19 being lockingly engageable in the socket elements 16 and being rotatable therein through substantial angles, whereby the post elements may be readily adjusted with respect to the socket elements to conform with the contour of the vehicle on which the post elements are mounted, as will be presently described.

As shown in Figure 5, each post element 20 comprises a top sleeve 21 to the top end of which the upstanding male snap fastener element 19 is secured, the sleeve 21 receiving a rod member 22 which may be clamped to the sleeve member in an adjusted position by means of a set screw 23 provided on the lower portion of the sleeve element 21, as is clearly shown in Figure 5. Secured to the bottom end of the rod element 22 is a suction cup 24 of suitable rubber-like material adapted to grippingly engage the subjacent surface of an automobile, whereby the post element 20 will be detachably secured to said subjacent surface.

Mounted on the frame 12 is a body of flexible awning material, shown at 26, said material comprising rubberized cloth, canvas, or the like, the material substantially covering the entire area defined within the frame 12 and extending to the fastening strip 13. Preferably, the marginal portion of the body of flexible material 26 is embedded in the strip 13 and is thus firmly and sealingly secured thereto, providing a water tight joint therewith.

In using the device, the strip 13 is first engaged on the marginal portion of the roof of the automobile adjacent to the top margin of the windshield 15, the engagement of the strip 13 being accomplished by merely pressing said strip onto the automobile roof, whereby the suction cups 14 grippingly engage the roof. The post elements 20 are then adjusted to proper length to support the main body of the awning in the desired position, the post members being then locked by tightening the set screws 23 thereof. The suction cups 24 of the post members are engaged on the subjacent surfaces of the vehicle in the manner illustrated in Figure 1, whereby the main portion of the awning is suitably supported in the position overlying the windshield 15 and protecting the windshield against obscurement by rain, snow, sleet, or the like.

While a specific embodiment of an improved windshield awning for a motor vehicle has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a windshield awning for a motor vehicle a substantially flat, horizontal strip of rubber-like material, a plurality of suction cups integrally molded in the bottom surface of and spaced along said strip and being adapted to detachably secure said strip to the body of a vehicle adjacent the top margin of the windshield thereof, a generally U-shaped frame of rigid rod material having its ends embedded in the end portions of said strip, and a body of flexible awning material having one margin thereof embedded in a longitudinal edge of said strip and defining a water-tight joint therewith and having its other margins secured to said frame.

References Cited in the file of this patent

UNITED STATES PATENTS

| | | |
|---|---|---|
| 868,413 | Cramer | Oct. 15, 1907 |
| 2,121,264 | Rubottom | June 21, 1938 |
| 2,227,541 | Groff | Jan. 7, 1941 |
| 2,485,473 | Bishop | Oct. 18, 1949 |
| 2,608,250 | Meyer | Aug. 26, 1952 |
| 2,633,381 | Francis | Mar. 31, 1953 |
| 2,785,001 | Soucy | Mar. 12, 1957 |
| 1,471,279 | Raggis | Oct. 16, 1923 |